(12) United States Patent
Nadolny Madsen

(10) Patent No.: US 12,123,503 B2
(45) Date of Patent: Oct. 22, 2024

(54) FLOW CONTROL SYSTEM AND METHOD FOR CONTROLLING THE FLOW OF LIQUID

(71) Applicant: Proxima Centauri ApS, Odense SV (DK)

(72) Inventor: Peter Nadolny Madsen, Svendborg (DK)

(73) Assignee: Proxima Centauri ApS, Odense SV (DK)

(*) Notice: Subject to any disclaimer, the term of this patent is extended or adjusted under 35 U.S.C. 154(b) by 97 days.

(21) Appl. No.: 18/121,768

(22) Filed: Mar. 15, 2023

(65) Prior Publication Data
US 2023/0220916 A1 Jul. 13, 2023

Related U.S. Application Data

(63) Continuation of application No. PCT/DK2021/050293, filed on Sep. 22, 2021.

(30) Foreign Application Priority Data

Sep. 24, 2020 (DK) .......................... PA 2020 01100

(51) Int. Cl.
*F16K 31/126* (2006.01)
*A22C 13/02* (2006.01)
(Continued)

(52) U.S. Cl.
CPC .......... *F16K 11/0716* (2013.01); *A22C 13/02* (2013.01); *A22C 17/14* (2013.01); *F16K 31/1268* (2013.01)

(58) Field of Classification Search
None
See application file for complete search history.

(56) References Cited

U.S. PATENT DOCUMENTS 2,800,138 A * 7/1957 Peters ................... F16K 31/128
137/122
3,010,438 A * 11/1961 Fife ..................... F16K 31/1266
137/625.6
(Continued)

FOREIGN PATENT DOCUMENTS

CN    209489408 U   10/2019
CN    110613011 A   12/2019
(Continued)

*Primary Examiner* — Matthew W Jellett
(74) *Attorney, Agent, or Firm* — Elevated IP, LLC

(57) ABSTRACT

Flow control systems and methods for controlling the flow of liquid into and out of a tubular member comprising a perforated portion that is configured to distribute a flow of liquid having a predefined fixed liquid pressure through the perforated portion to pressurize an intestine that is suspended on the tubular member is disclosed. The flow control system comprises a flow regulating valve having a slidably arranged valve structure arranged in a pressurized liquid filled water chamber and an elastic water-side diaphragm arranged in the water chamber and connected to the valve structure such that the water-side diaphragm allows the valve structure to be moved in a first direction along the longitudinal axis of the valve structure to increase the volume in the water chamber and be moved in the opposite direction to decrease the volume in the water chamber.

20 Claims, 3 Drawing Sheets

(51) Int. Cl.
  *A22C 17/14* (2006.01)
  *F16K 11/07* (2006.01)

(56) References Cited

U.S. PATENT DOCUMENTS

| | | | | |
|---|---|---|---|---|
| 3,242,524 | A | * | 3/1966 | Von Witzleben .... B29D 23/001 223/43 |
| 3,590,422 | A | * | 7/1971 | Matecki ................. A22C 13/02 452/28 |
| 3,631,566 | A | * | 1/1972 | Dhuysser ............... A22C 13/02 452/28 |
| 3,672,399 | A | * | 6/1972 | Furrer ................... F16K 31/385 137/625.68 |
| 3,726,302 | A | * | 4/1973 | Lawsing ............... G05D 7/0126 251/63.4 |
| 3,934,309 | A | * | 1/1976 | Sheridan ............. A22C 13/0003 452/28 |
| 3,938,220 | A | * | 2/1976 | Sheridan ................ A22C 13/02 452/28 |
| 4,193,423 | A | * | 3/1980 | Stoll ................... F16K 31/1266 137/625.5 |
| 4,754,776 | A | * | 7/1988 | McKee ................. F16K 11/044 92/49 |
| 5,139,225 | A | * | 8/1992 | Olson ................... F16K 27/003 251/335.2 |
| 5,217,404 | A | * | 6/1993 | Lanfrey ................. A22C 17/14 33/544.3 |
| 5,938,098 | A | * | 8/1999 | Fife .................... B65H 23/0326 226/22 |
| 7,306,511 | B2 | | 12/2007 | Whittlesey et al. |
| 2003/0110833 | A1 | | 6/2003 | Jolic |
| 2008/0023661 | A1 | | 1/2008 | Gu et al. |
| 2009/0126801 | A1 | | 5/2009 | Grill et al. |
| 2010/0011840 | A1 | | 1/2010 | Carson |
| 2010/0224804 | A1 | | 9/2010 | Sneh |
| 2012/0142261 | A1 | | 6/2012 | Hanten |
| 2013/0180599 | A1 | | 7/2013 | Hurst |
| 2016/0091101 | A1 | | 3/2016 | Neubauer et al. |

FOREIGN PATENT DOCUMENTS

| | | |
|---|---|---|
| CN | 209965113 U | 1/2020 |
| CN | 210664355 U | 6/2020 |
| CN | 210869670 U | 6/2020 |
| CN | 111521355 A | 8/2020 |
| EP | 0247530 A2 | 12/1987 |
| EP | 1623628 A2 | 2/2006 |
| GB | 1261760 A | 1/1972 |
| GB | 2428182 A | 1/2007 |
| JP | H0974988 A | 3/1997 |
| JP | 2004000152 A | 1/2004 |
| WO | 2020002208 A1 | 1/2020 |
| WO | 2020064074 A1 | 4/2020 |
| WO | 2020125892 A1 | 6/2020 |

\* cited by examiner

FLOW CONTROL SYSTEM AND METHOD FOR CONTROLLING THE FLOW OF LIQUID

CROSS-REFERENCE TO RELATED APPLICATIONS

This application is a continuation under 35 U.S.C. 111 of International Patent Application No. PCT/DK2021/050293, filed Sep. 22, 2021, which claims the benefit of and priority to Danish Application No. PA 2020 01100, filed Sep. 24, 2020, each of which is hereby incorporated by reference in its entirety.

FIELD OF INVENTION

The present disclosure relates to systems and methods for controlling the flow of liquid in order to maintain a constant pressure in a tubular member having a perforated portion that is configured to distribute a flow of liquid through the perforated portion and hereby pressurize an intestine suspended on the tubular member.

BACKGROUND

To determine the quality and to cut the carcass into valuable parts of meat, the examination and processing devices are controlled relative to the location of anatomical parts of the carcass. Intestines from the animals are processed in a similar way, and e.g. natural casings are of major interest.

Processing of intestines from the animals involves several steps including cleaning the intestines, scraping of the inner wall of the intestines to remove the mucous layer and scraping of the outer part of the intestines. An additional step of measurement is carried out in order to pack the intestines according to their size and quality. In the step of measurement, the diameter of each intestine is detected so that the diameter can be used to classify the intestine and to cut the intestine into pieces based on the diameter along the length of the intestine.

The detection of the diameter is carried out by inflating the intestine with water or air in order to measure its diameter. In practice, the intestine is suspended on a tubular member having a perforated portion that is configured to distribute a flow of liquid through the perforated portion and hereby pressurize the intestine suspended on the tubular member.

Since the diameter of an intestine varies along its length, it is important to be able to perform a fast regulation of the flow of the fluid (typically water or air) used to inflate the intestine. When the diameter of an intestine increases, the fluid flows into the tubular member in order to inflate the intestine. When the diameter of an intestine decreases, however, there is a flow of fluid from the intestine via the tubular member out through an outlet port. This flow regulation must be done in a fast and reliable manner.

CN 209489408 U discloses a method and an apparatus for automatic detection of the diameter or leaks in an intestine. The apparatus comprises an electromagnetic flow control valve connected to a tube on which the intestine is suspended. A water tank is arranged between the flow control valve and the tube. The flow control valve is connected to a pressure sensor arranged to detect the water pressure. This solution is, however, not capable of allowing for draining excess water through the valve.

BRIEF DESCRIPTION

It is an object of the present invention to provide a method to carry out a sufficiently fast flow regulation in a fast and reliable manner.

It is also an object of the present invention to provide a system for controlling the flow of liquid in a reliable and sufficiently fast manner.

It is an object to have a valve that can be controlled such that the flow can be regulated such that the pressure is kept constant.

In an embodiment, a method for controlling the flow of liquid into a tubular member and from the tubular member, wherein the tubular member comprises a perforated portion that is configured to distribute a flow of liquid having a predefined fixed liquid pressure through the perforated portion and hereby pressurize an intestine that is suspended on the tubular member, wherein the method comprises the step of controlling the flow of liquid such that the pressure of liquid in the tubular member is maintained within a predefined pressure range. The method comprises the step of applying a flow regulating valve comprising:

- a water inlet port for letting liquid into the flow regulating valve;
- a water outlet port for draining liquid from the flow regulating valve;
- a flow port being in fluid communication with the tubular member;
- a flow regulating member being in fluid communication with the flow port, wherein the flow regulating member is configured and arranged to be positioned in:
  - a) a first configuration, in which liquid from the water inlet port can flow into the flow regulating valve, wherein no liquid can be drained through the water outlet port;
  - b) a second configuration, in which liquid from the flow regulating valve can be drained through the water outlet port, wherein no liquid from the water inlet port can flow into the flow regulating valve;
- a force generating device connected to the flow regulating member in such a manner that the motion of the force generating device causes motion of the flow regulating member and
- a force countering device connected to the flow regulating member in such a manner that the motion of the force countering device causes motion of the flow regulating member, wherein the method comprises the step of applying a predefined force ($F_{air}$) towards the force generating device using a force generating unit.

Hereby, it is possible to provide a method to carry out a sufficiently fast flow regulation in a fast and reliable manner.

In an embodiment, the liquid is a water containing liquid.
In an embodiment, the liquid is water.

Generally, the force generating unit is controllable. Hereby, it is possible to set and change the force applied to the flow regulating member.

In an embodiment, the force generating unit comprises a spring.

In an embodiment, the force generating unit is a spring.
In an embodiment, the force generating unit comprises a magnetic actuator.

In an embodiment, the force generating unit is a magnetic actuator.

In an embodiment, the force generating unit comprises a pneumatic actuator.

In an embodiment, the force generating unit is a pneumatic actuator.

In an embodiment, the force generating unit comprises a hydraulic actuator.

In an embodiment, the force generating unit is a hydraulic actuator.

In an embodiment, the method comprises the step of using a flow regulating valve that comprises:
- a slidably arranged valve structure arranged in a pressurized liquid filled water chamber;
- an elastic water-side diaphragm arranged in the water chamber and connected to the valve structure such that the water-side diaphragm allows the valve structure to:
  a) be moved in a first direction along the longitudinal axis of the valve structure and hereby increase the volume in the water chamber and
  b) be moved in the opposite direction along the longitudinal axis of the valve structure and hereby decrease the volume in the water chamber, wherein the method comprises the step of providing a force towards the slidably arranged valve structure using a force generating unit arranged and configured to provide a predefined force to move the slidably arranged valve structure in a predefined direction.

By controlling the flow of liquid such that the pressure of liquid in the tubular member is maintained within a predefined pressure range, it is possible to measure the diameter of an intestine by inflating the intestine with the liquid (e.g. water).

In an embodiment, the method comprises the step of using the force generating unit to provide a force towards the slidably arranged valve structure using a force generating unit arranged and configured to provide a predefined force to move the slidably arranged valve structure in a predefined direction.

In an embodiment, the predefined direction corresponds to the opposite direction.

The tubular member may comprise a rod-shaped portion.

In an embodiment, the distal portion of the tubular member tapers.

In an embodiment, the perforated portion is formed as a plurality of holes (through bores) in the radial surface of the tubular member.

In an embodiment, the perforated portion is formed as one or more slots provided in the radial surface of the tubular member.

In an embodiment, at least a portion of the tubular member is formed as a pipe.

In an embodiment, the method comprises the step of applying a flow regulating valve comprising a slidably arranged valve structure arranged in a pressurized liquid filled water chamber.

The valve structure may comprise a hollow central portion and a number of holes provided along the radial surface of the valve structure.

In an embodiment, the valve structure comprises a hollow cylindrical portion provided with a number of holes along its radial surface. Hereby, the valve structure can establish fluid communication between the tubular member via the hollow portion and an inlet or an outlet through the hole(s).

The elastic water-side diaphragm may be formed of any suitable material such as an elastomer. The water-side diaphragm is arranged in the water chamber and connected to the valve structure such that the water-side diaphragm moves the valve structure when a force is applied to the water-side diaphragm.

The water-side diaphragm is arranged and configured to allow the valve structure to be moved in a first direction along the longitudinal axis of the valve structure and hereby increase the volume in the water chamber. When the pressure inside the intestine increases because the diameter of the intestine decreases, the water pressure inside the flow regulating valve will increase accordingly since the flow regulating valve is in fluid communication with the tubular member and thus the water inside the intestine. The increased pressure will cause the valve structure to move and hereby establish fluid communication between the valve structure and an outlet port of the flow regulating valve in order to drain excess liquid from the intestine.

In an embodiment, the first direction is a direction in which the distal portion of the valve structure is moved towards the central portion of the flow regulating valve.

The water-side diaphragm is arranged and configured to allow the valve structure to be moved in the opposite direction along the longitudinal axis of the valve structure and hereby decrease the volume in the water chamber. When the pressure inside the intestine decreases because the diameter of the intestine increases, the water pressure inside the flow regulating valve will decrease accordingly due to the fluid communication between the flow regulating valve and the tubular member and thus the water inside the intestine. The decreased pressure will cause the valve structure to move and hereby establish fluid communication between the valve structure and an inlet port of the flow regulating valve in order to receive liquid delivered from a liquid supply (e.g. a water inlet pipe or a reservoir).

The step of providing a force towards the valve structure can be accomplished by using various types of force generating units arranged and configured to provide a predefined force to move the slidably arranged valve structure in a predefined direction.

In an embodiment, the force generating unit comprises a spring arranged and configured to press against the water-side diaphragm.

In an embodiment, the force generating unit comprises an electrical actuator arranged and configured to press against the water-side diaphragm.

In an embodiment, the predefined fixed liquid pressure is in the range 5-100 mbar.

In an embodiment, the predefined fixed liquid pressure is in the range 10-80 mbar.

In an embodiment, the predefined fixed liquid pressure is in the range 15-60 mbar.

In an embodiment, the predefined fixed liquid pressure is in the range 20-40 mbar.

In an embodiment, the predefined fixed liquid pressure is in the range 25-35 mbar.

In an embodiment, the predefined fixed liquid pressure is 30 mbar.

It may be an advantage that the force generating unit is integrated in the flow regulating valve. Hereby, a more compact solution can be provided.

In an embodiment, the force generating unit comprises an air-side diaphragm, wherein the flow regulating valve comprises an air or gas containing pressure chamber which is separated from a remaining portion of the valve via the air-side diaphragm. Hereby, it is possible to provide an air space that is compressible and thus capable of providing a force that can be transferred to and thus applied towards the slidably arranged valve structure. Moreover, it is possible to control the pressure inside the air or gas containing pressure chamber.

In an embodiment, the liquid containing water chamber is separated from a remaining portion of the valve via the water-side diaphragm, wherein the slider is slidably arranged in an inner space of the valve, wherein the air-side diaphragm and water-side diaphragm are arranged and configured in such a manner that air or gas in the pressure chamber provides a pressure that forces the air-side diaphragm to press against the slider, wherein a liquid (e.g. water) in the water chamber provides a pressure that forces the water-side diaphragm to press against the slider in the opposite direction than the air-side diaphragm. Hereby, it is possible to provide a simple and reliable and very fast flow regulation.

It may be an advantage that an intermediate chamber is provided between the water-side diaphragm and the air-side diaphragm.

In an embodiment, a method comprises the step of maintaining a pressure corresponding to the ambient pressure in the intermediate chamber. Hereby, it is not required to compensate for fluctuation in the ambient pressure when controlling the pressure inside the pressure chamber.

A flow control system according to an embodiment is a flow control system for controlling the flow of liquid into a tubular member and from the tubular member, wherein the tubular member comprises a perforated portion that is configured to distribute a flow of liquid having a predefined fixed liquid pressure through the perforated portion and hereby pressurize an intestine that is suspended on the tubular member,
wherein the flow control system comprises a flow regulating valve comprising:
  a water inlet port for letting liquid into the flow regulating valve;
  a water outlet port for draining liquid from the flow regulating valve;
  a flow port being in fluid communication with the tubular member;
  a flow regulating member being in fluid communication with the flow port, wherein the flow regulating member is configured and arranged to be positioned in:
    a) a first configuration, in which liquid from the water inlet port can flow into the flow regulating valve, wherein no liquid can be drained through the water outlet port;
    b) a second configuration, in which liquid from the flow regulating valve can be drained through the water outlet port, wherein no liquid from the water inlet port can flow into the flow regulating valve;
  a force generating device connected to the flow regulating member such that the motion of the force generating device causes motion of the flow regulating member and
  a force countering device connected to the flow regulating member such that the motion of the force countering device causes motion of the flow regulating member;
  a force generating unit configured to provide a predefined force towards the force generating device.

In an embodiment, the flow regulating valve is a ball valve.

In an embodiment, the flow regulating valve is a needle valve.

In an embodiment, the flow regulating valve is a rotary valve (e.g. a butterfly valve).

In an embodiment, the flow regulating valve is a gate valve.

In an embodiment, a pressure regulating valve is used to control the flow regulating valve in a manner in which liquid from a liquid supply is allowed to enter the tubular member via the flow regulating valve if the pressure in the tubular member is too low (below $P_{W1}$) and allow liquid to pass from the tubular member via the water outlet port to a drain if the pressure in the tubular member is too high (above $P_{W2}$).

The functions of allowing a flow of liquid into and out from the tubular member, respectively, can take place in one or two different valves.

In an embodiment, the flow regulating valve comprises:
  a slidably arranged valve structure arranged in a pressurized liquid filled water chamber;
  an elastic water-side diaphragm arranged in the water chamber and connected to the valve structure such that the water-side diaphragm allows the valve structure to:
    a) be moved in a first direction along the longitudinal axis of the valve structure and hereby increase the volume in the water chamber and
    b) be moved in the opposite direction along the longitudinal axis of the valve structure and hereby decrease the volume in the water chamber,
wherein the flow control system comprises a force generating unit arranged and configured to provide a predefined force to move the slidably arranged valve structure in a predefined direction, wherein the force generating unit is configured to control the flow of liquid such that the pressure of liquid in the tubular member is maintained within a predefined pressure range.

Hereby, it is possible to provide a system for controlling the flow of liquid in a reliable and sufficiently fast manner.

In an embodiment, the force generating unit is integrated in the flow regulating valve. By integrating the force generating unit, a more compact system can be provided. Moreover, regulation of the flow can be accomplished in an easy and fast manner.

It may be advantageous that the force generating unit comprises an air-side diaphragm and that the flow regulating valve comprises an air or gas containing pressure chamber that is separated from a remaining portion of the valve via the air-side diaphragm. Hereby, the flow can be regulated using a pneumatic regulator that can provide the desired pilot pressure. Moreover, the pilot pressure can be changed in a fast and easy manner.

In an embodiment, the flow control system comprises:
  an air or gas containing pressure chamber which is separated from a remaining portion of the valve via an air-side diaphragm;
  a liquid containing water chamber that is separated from a remaining portion of the valve via a water-side diaphragm;
  a slider slidably arranged in an inner space of the valve, wherein the air-side diaphragm and water-side diaphragm are arranged and configured in such a manner that air or gas in the pressure chamber provides a pressure that forces the air-side diaphragm to press against the slider, wherein a liquid (e.g. water) in the water chamber provides a pressure that forces the water-side diaphragm to press against the slider in the opposite direction than the air-side diaphragm.

In an embodiment, the liquid containing water chamber is separated from a remaining portion of the valve via the water-side diaphragm, wherein the slider is slidably arranged in an inner space of the valve, wherein the air-side diaphragm and water-side diaphragm are arranged and configured in such a manner that air or gas in the pressure chamber provides a pressure that forces the air-side diaphragm to press against the slider, wherein a liquid in the water chamber provides a pressure that forces the water-side diaphragm to press against the slider in the opposite direction than the air-side diaphragm.

In an embodiment, the liquid in the water chamber is water.

It may be an advantage that an intermediate chamber is provided between the water-side diaphragm and the air-side diaphragm.

In an embodiment, the intermediate chamber is in fluid communication with the surroundings by one or more vents. Hereby, the pressure in the intermediate chamber corresponds to the ambient pressure. Accordingly, it is not required to compensate for fluctuation in the ambient pressure when controlling the pressure inside the pressure chamber.

In an embodiment, the slidably arranged valve structure is a hollow rod member.

In an embodiment, the valve structure comprises a hollow central portion and a number of holes provided along the radial surface of the valve structure.

In an embodiment, the valve structure comprises a hollow cylindrical portion provided with a number of holes along its radial surface.

In an embodiment, the ratio between the product of the pressure and the area of the air-side diaphragm and water-side diaphragm is in the range R:1, where R is between 20 and 50.

In an embodiment, the ratio between the product of the pressure and the area of the air-side diaphragm and water-side diaphragm is in the range R:1, where R is between 25 and 40.

In an embodiment, the ratio between the product of the pressure and the area of the air-side diaphragm and water-side diaphragm is in the range R:1, where R is between 30 and 35.

In an embodiment, the ratio between the product of the pressure and the area of the air-side diaphragm and water-side diaphragm is in the range R:1, where R is 33.

It may be an advantage that the flow control system comprises an air pressure control unit, wherein the pressure chamber comprises an air inlet port for allowing a flow of air between the pressure chamber and the air pressure control unit. Hereby, the air pressure control unit can be used to change the predefined fixed pressure in the liquid chamber.

BRIEF DESCRIPTION OF THE DRAWINGS

The systems and methods disclosed will become more fully understood from the detailed description given herein below. The accompanying drawings are given by way of illustration only, and thus, they are not limitative of the present invention. In the accompanying drawings.

DETAILED DESCRIPTION

Figure 1:
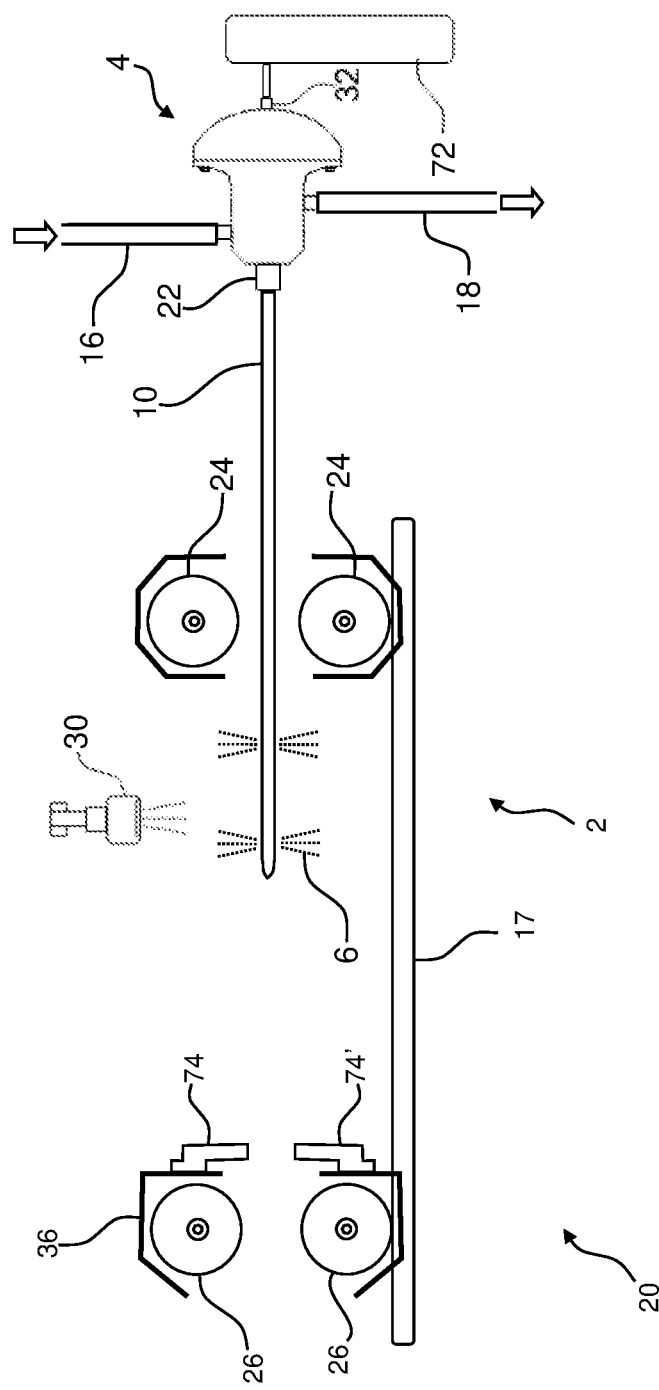
FIG. 1 shows a schematic view of a flow control system, according to an embodiment, used to regulate the flow to a processing unit configured to detect the diameter of intestines.
Figure 2:
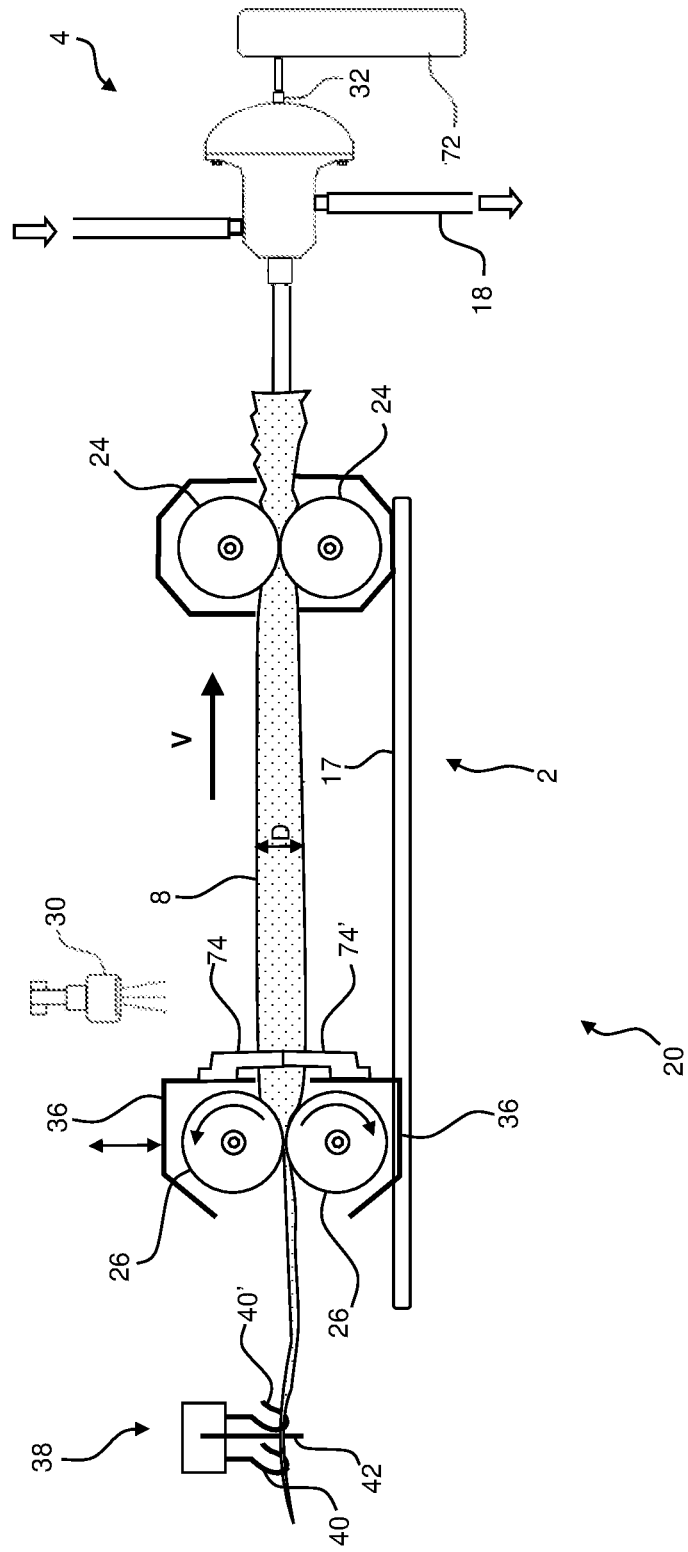
FIG. 2 shows a schematic view of the flow control system shown in FIG. 1 in another configuration.

Referring now in detail to the drawings for the purpose of illustrating embodiments of the present systems and methods, a flow control system 2 is illustrated in FIG. 1. FIG. 2 illustrates a schematic view of the flow control system 2 shown in FIG. 1 in a configuration, in which an intestine 8 has been suspended on a tubular member 10 of the processing unit 20 that comprises the flow control system 2.

FIG. 1 and FIG. 2 illustrate schematic views of a flow control system 2, according to an embodiment, used to regulate the flow to a processing unit 20 configured to detect the diameter D of intestines 8.

The processing unit 20 is configured to detect the diameter D of an intestine 8 while the intestine 8 is suspended on a tubular member 10 having a perforated portion that is configured to distribute a flow of liquid 6 through the perforated portion and hereby pressurize the intestine 8. Accordingly, the detected diameter can be used to classify the intestine 8 and to cut the intestine 8 into pieces. The tubular member 10 may be formed as a metal pipe. The perforated portion may be established by providing a plurality of slots or holes in the metal pipe.

The tubular member 10 extends horizontally. The processing unit 20 comprises two drive rollers 24. At least one of the drive rollers 24 comprises a circumferential track configured to engage with the tubular member 10.

At least one of the drive rollers 24 is arranged and configured to move the intestine 8 with a non-zero velocity V along the longitudinal axis of the tubular member 10. Accordingly, at least one of the drive rollers 24 is connected to a motor (not shown). Accordingly, the drive rollers 24 are capable of pulling the intestine 8 towards the righthand side of the drive rollers 24 and hereby move the intestine with the velocity V as indicated in FIG. 2.

In an embodiment, the drive rollers 24 are shaped in the same way so that both drive rollers 24 comprise a circumferential track configured to engage with the tubular member 10. In an embodiment, the drive rollers 24 are shaped in the same way so that both drive rollers 24 comprise a circumferential track configured to engage with the tubular member 10.

The processing unit 20 comprises two clamping rollers 26 arranged to be brought into a clamping configuration, in which the intestine 8 is clamped by the clamping rollers 26.

In the processing unit 20 illustrated in FIG. 1 and FIG. 2, detection of the diameter D is carried out by inflating the intestine 8 with water or another liquid. An optical sensor 30 is arranged to detect the diameter D of the intestine 8.

A valve 4 is connected to a first end of the tubular member 10. The opposite end of the tubular member 10 tapers and is configured to receive an intestine 8. The valve 4 comprises a flow port 22 that is connected to the tubular member 10. The valve 4 comprises a water inlet port that is connected to an inlet pipe 16. Likewise, the valve 4 comprises a water outlet port 18 that is connected to an outlet pipe 18.

In an embodiment, the inlet pipe 16 is connected to a water supply. In an embodiment, the inlet pipe 16 is connected to a water reservoir (e.g. a water tank).

In an embodiment, the outlet pipe 18 is connected to a drain.

In an embodiment, the flow control system 2 comprises a suction unit that is connected to the outlet pipe 18. Hereby, the excess liquid can be sucked out of the valve 4 in a very fast manner.

The valve 4 must be configured to perform a fast regulation of the flow of water used to inflate the intestine 8. When the diameter D of the intestine 8 increases, water flows from the valve 4 into the tubular member 10 in order to inflate the intestine 8. When the diameter D of the intestine 8 decreases, the liquid (e.g. water) 6 will flow from the intestine 8 via the tubular member 10 into the flow port 22 of the valve 4.

The inlet pipe 16 may be connected to a storage tank. In principle it is possible to connect the outlet pipe 18 to a tank in order to reuse the water used for inflating the intestine 8. Typically, however, the excess liquid from the intestine 8 will be drained away.

In an embodiment, the valve 4 comprises a pressure chamber that is pressured by air. In this embodiment, the valve 4 is configured to enable flow regulation on the basis of the pressure within the air pressure. Accordingly, the valve 4 is controlled by regulating the air pressure using an air pressure control unit 72 that is connected to the air inlet port 32 of the valve 4. The valve 4 comprises a housing 50 comprising several housing components.

The processing unit 20 is designed for processing an intestine 8 having an open end. In an embodiment, the processing unit 20 comprises an electrically conducting tubular member 10. The tubular member 10 has a perforated portion that is configured to distribute a flow of liquid (such as water) through the perforated portion. The tubular member 10 is arranged and configured to receive the open end of the intestine 8 and hereby allow the intestine 8 to be suspended on the tubular member 10 and hereby pressurize the intestine 8 with the liquid.

The processing unit 20 comprises two clamping rollers 26 arranged to be brought into a clamping configuration, in which the intestine 8 is clamped by the clamping rollers 26.

The distal end of the tubular member 10 is arranged between the drive rollers 24 and the clamping rollers 26. The processing unit 20 comprises a detection unit 2. The detection unit 2 is arranged between the drive rollers 24 and the clamping rollers 26.

Each of the clamping rollers 26 is partly covered by a screen 36. The screen 36 may be made of a non-conducting material (e.g. a plastic material). The processing unit 20 comprises a detection unit configured to detect a leakage hole in an intestine 8 suspended on the tubular member when the intestine 8 is being moved with a non-zero velocity V along the longitudinal axis of the tubular member 10. The detection unit comprises an electrically conducting and axially extending sleeve-shaped surrounding portion 74, 74' that is configured to be brought into a configuration (as shown in FIG. 2), in which the surrounding portion surrounds the circumference of the tubular member 10.

The detection unit comprises an electric circuitry arranged and configured to measure an electric quantity such as the electric resistance or the electric current which is established between the surrounding portion and the tubular member 10.

The lowermost drive roller 24 and the lowermost clamping roller 26 are slidably mounted on a slide rod 17 for allowing an easy adjustment of the horizontal position of the rollers 24, 26.

In FIG. 2 an intestine 8 is suspended on an intestine detector 38 according to an embodiment. The intestine detector 38 comprises a first end detector 40 and a second end detector 40' arranged a non-zero distance from the first end detector. The intestine detector 38 comprises an intermediate detector 42 arranged and distanced between each of the end detectors 40, 40' in such a configuration that the intermediate detector 42 will be electrically connected to any intestine suspended on the end detectors 40, 40' and extending between the first end detector 40 and the second end detector 40'.

Each of the end detectors 40, 40' are shaped to receive and maintain an intestine suspended on the end detector 40, 40'. The end detectors 40, 40' have the same geometric form. The end detectors 40, 40' comprise a hook-shaped portion. The intermediate detector, however, has a straight distal portion extending between the first end detector 40 and the second end detector 40'.

The end detectors 40, 40' extend through a mounting box that comprises electrical connection structures for connecting an electric circuitry configured to perform one of more electrical measurements using the detectors 40, 40', 42.

The intestine 8 is received by the tubular member 10 and is suspended thereon. Furthermore, the intestine 8 is pressurized and thus inflated by water from the tubular member 10. The intestine 8 is clamped between the clamping rollers 26 in a first position of the intestine 8 and by the drive rollers 24 in another position of the intestine 8.

Figure 3:
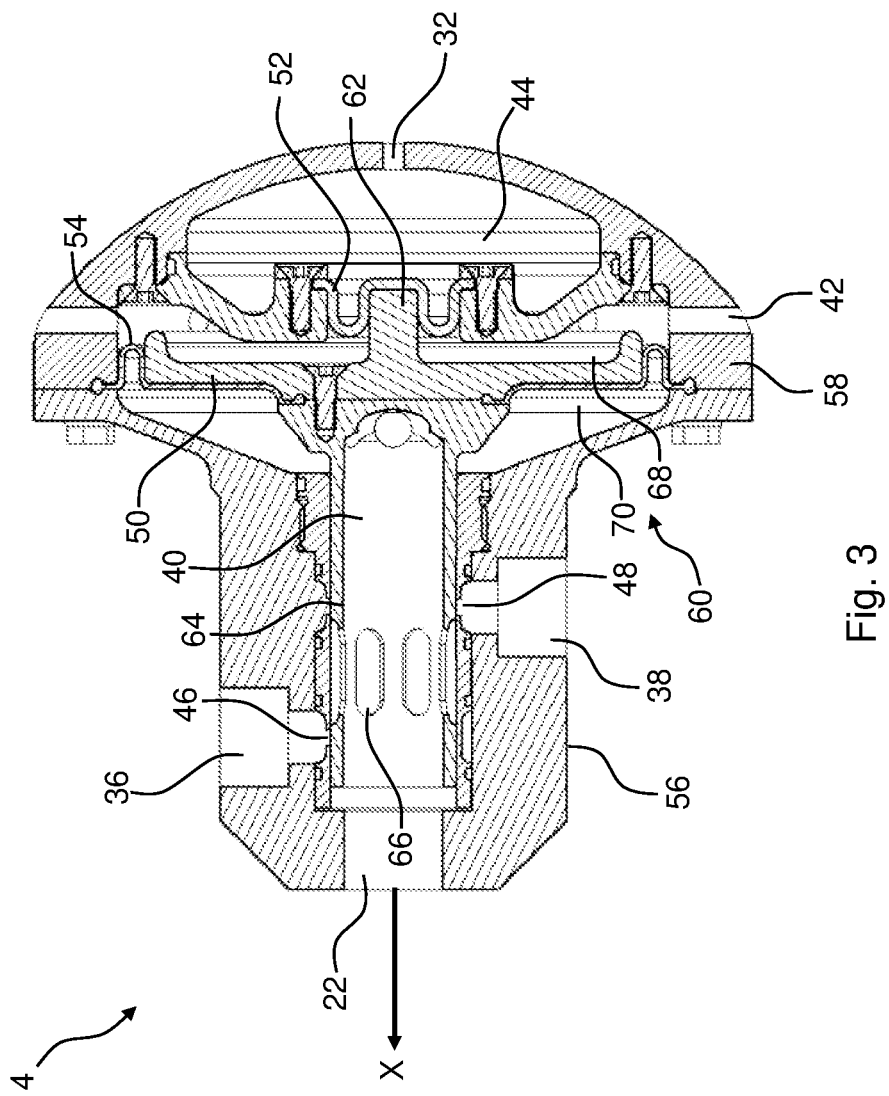
FIG. 3 shows the flow regulating valve of a flow control system, according to an embodiment.

FIG. 3 illustrates a cross-sectional view of a valve 4 of a flow control system according to an embodiment. The valve 4 comprises a housing 60 having a first housing component 56 and a second housing component 58 that are attached to each other by bolts. The first housing component 56 comprises an inner space. A slider 40 is slidably arranged in the inner space of the first housing component 56. Accordingly, the slider can be moved along the longitudinal axis X of the valve 4. The slider 40 has a cylindrical body portion 64 provided with a series of openings 66 provided along the circumference of a central part of the cylindrical body.

A water inlet port 36 and a water outlet port 38 are provided next to each other. The water inlet port 36 extends from an inlet valve opening 46 provided in the inner space to the outer periphery of the first housing component 56. Likewise, the water outlet port 38 extends from an outlet valve opening 48 provided in the inner space to the outer periphery of the first housing component 56. Accordingly, these ports 36, 38 are configured to establish fluid communication between the inner space and external pipes connected to the inlet port 36 and a water outlet port 38, respectively, when the slider 40 is arranged in a position in which water can flow between the inner space and the valve openings 46, 48, respectively.

A water chamber 70 is provided in extension of the proximal portion of the inner space. The water chamber 70 is in fluid communication with the inner space and thus the water inlet 36, the water outlet 38 and the flow port 22.

A pressure chamber 44 is provided in the second housing component 58. An intermediate chamber 68 is provided between the pressure chamber 44 and the plate member 50 from which the rod member 62 protrudes. The intermediate chamber 68 is connected to the surroundings via vents 42. Accordingly, the pressure in the intermediate chamber 68 corresponds to the ambient pressure. By increasing the pressure $P_C$ in the pressure chamber 44 it is possible to move the rod member 62.

The valve 4 comprises an air-side diaphragm 52 that separates the central portions of the pressure chamber 44 and the intermediate chamber 68. Accordingly, the pressure gradient between the pressure chamber 44 and the intermediate chamber 68 will determine the magnitude and direction of the force with which the air-side diaphragm 52 presses against the rod member 62. Since the rod member 62 is part of the plate member 50 which is mechanically attached to the slider 40, the force from the air-side diaphragm 52 towards the rod member 62 will move the slider 40 along the longitudinal axis X of the valve 4. The water in the water chamber 70 presses towards the water-side diaphragm 54 and plate member 50 covered by it. Accordingly, the position and motion of the slider 40 along the longitudinal axis X of the valve 4 is influenced by the forces applied to the pressure chamber 44.

The working principle of the valve 4 is based on the equivalence between the forces acting on the air-side diaphragm 52 and the water-side diaphragm 54, respectively. In an embodiment, the ratio between the product of the pressure and area onto which the pressure acts is 1:33.

If the pressure in the water chamber 70 is too small, the slider 44 is pushed to the left. This will cause the opening of the inlet valve opening 46 by aligning the opening 66 with the valve opening 46. Accordingly, water will flow into the valve 4 through the water inlet 36.

When the pressure in the water chamber 70 rises, the force on the water-side diaphragm 50 increases until an equivalence between the forces acting on the air-side diaphragm 52 and the water-side diaphragm 54, is established and the slider 44 moves to its central position as shown in FIG. 2, thereby closing the inlet valve opening 46.

The slider 44 is pushed to the right if the water pressure increases further. In this case, the slider 44 will be arranged in such a positioned that it causes an opening of the outlet valve opening 48. Thus, excess water will flow out from the valve 4 via the water outlet 38.

When the pressure in the water chamber 70 has been decreased to the equivalence level, the slider 44 is pushed back to the center position, in which the slider 44 closes the water inlet 36 and the water outlet 38.

The valve 4 is designed to accommodate a high flow at low pressure. Accordingly, the water inlet 36 and the water outlet 38 must be relatively large in order to reduce the flow resistance.

LIST OF REFERENCE NUMERALS

2 Flow control system
4 Valve
6 Liquid
8 Intestine
10 Tubular member
14 Reservoir
16 Inlet
17 Rod
18 Outlet
20 Processing unit
22 Flow port
24 Roller
26 Roller
30 Sensor
32 Air inlet port
36 Water inlet port
38 Water outlet port
40 Slider
42 Vent
44 Pressure chamber
46 Inlet valve opening
48 Outlet valve opening
50 Plate member
52 Air-side diaphragm
54 Water-side diaphragm
56, 58 Housing component
60 Housing
62 Rod member
64 Cylindrical body portion
66 Opening
68 Intermediate chamber
70 Water chamber
72 Air pressure control unit
74, 74' Sleeve-shaped surrounding portion
D Diameter
X Longitudinal axis
$P_C$ Pressure in the pressure chamber
$P_W$, $P_{W1}$, $P_{W2}$ Pressure in the water chamber

What is claimed is:

1. A method for controlling a flow of liquid into a tubular member and from the tubular member, the method comprising:
   providing the tubular member having a perforated portion that is configured to distribute a flow of liquid having a predefined fixed liquid pressure ($P_w$) through the perforated portion, thereby pressurizing an intestine that is suspended on the tubular member;
   controlling the flow of liquid such that the pressure of liquid in the tubular member is maintained within a predefined pressure range ($P_{W1}$-$P_{W2}$) using a flow regulating valve comprising:
   a water inlet port for letting liquid into the flow regulating valve;
   a water outlet port for draining liquid from the flow regulating valve;
   a flow port in fluid communication with the tubular member; and
   a flow regulating member in fluid communication with the flow port, wherein the flow regulating member is configured and arranged to be positioned in:
   a) a first configuration, in which liquid from the water inlet port can flow into the flow regulating valve, wherein no liquid can be drained through the water outlet port; or
   b) a second configuration, in which liquid from the flow regulating valve can be drained through the water outlet port, wherein no liquid from the water inlet port can flow into the flow regulating valve;
   a force generating device connected to the flow regulating member such that motion of the force generating device causes motion of the flow regulating member; and
   a force countering device connected to the flow regulating member such that motion of the force countering device causes motion of the flow regulating member; and
   applying a predefined force ($F_{air}$) towards the force generating device using a force generating unit.

2. The method according to claim 1, wherein the flow regulating valve further comprises:
   a slidably arranged valve structure arranged in a pressurized liquid filled water chamber;
   an elastic water-side diaphragm arranged in the water chamber and connected to the valve structure such that the water-side diaphragm allows the valve structure to:
   a) be moved in a first direction along a longitudinal axis of the valve structure and hereby increase a volume in the water chamber; and
   b) be moved in an opposite direction along the longitudinal axis of the valve structure and hereby decrease the volume in the water chamber, and
   wherein the method comprises the step of providing a force ($F_{air}$) towards the slidably arranged valve structure using the force generating unit arranged and configured to provide a predefined force ($F_{air}$) to move the slidably arranged valve structure in a predefined direction.

3. The method according to claim 2, further comprising providing an intermediate chamber between the water-side diaphragm and the air-side diaphragm.

4. The method according to claim 1, wherein the force generating unit is integrated in the flow regulating valve.

5. The method according to claim 4, wherein the force generating unit comprises an air-side diaphragm, wherein the flow regulating valve comprises an air or gas containing pressure chamber which is separated from a remaining portion of the flow regulating valve via the air-side diaphragm.

6. The method according to claim 5, wherein the liquid containing water chamber is separated from a remaining portion of the flow regulating valve via a water-side diaphragm, wherein a slider is slidably arranged in an inner space of the flow regulating valve, wherein the air-side diaphragm and the water-side diaphragm are arranged and configured such that air or gas in the pressure chamber provides a pressure that forces the air-side diaphragm to press against the slider, wherein a liquid in the water chamber provides a pressure that forces the water-side diaphragm to press against the slider in the opposite direction than the air-side diaphragm.

7. The method according to claim 6, further comprising providing an intermediate chamber between the water-side diaphragm and the air-side diaphragm.

8. The method according to claim 7, further comprising maintaining a pressure corresponding to ambient pressure in the intermediate chamber.

9. A flow control system for controlling a flow of liquid into a tubular member and from the tubular member, the flow control system comprising:
the tubular member having a perforated portion that is configured to distribute a flow of liquid having a predefined fixed liquid pressure ($P_w$) through the perforated portion, thereby pressurizing an intestine that is suspended on the tubular member;
a flow regulating valve comprising:
a water inlet port for letting liquid into the flow regulating valve;
a water outlet port for draining liquid from the flow regulating valve;
a flow port in fluid communication with the tubular member; and
a flow regulating member in fluid communication with the flow port, wherein the flow regulating member is configured and arranged to be positioned in:
a) a first configuration, in which liquid from the water inlet port can flow into the flow regulating valve, wherein no liquid can be drained through the water outlet port; or
b) a second configuration, in which liquid from the flow regulating valve can be drained through the water outlet port, wherein no liquid from the water inlet port can flow into the flow regulating valve;
a force generating device connected to the flow regulating member such that motion of the force generating device causes motion of the flow regulating member; and
a force countering device connected to the flow regulating member such that motion of the force countering device causes motion of the flow regulating member; and
a force generating unit configured that provides a predefined force ($F_{air}$) towards the force generating device.

10. The flow control system according to claim 9, wherein the flow regulating valve further comprises:
a slidably arranged valve structure arranged in a pressurized liquid filled water chamber;
an elastic water-side diaphragm arranged in the water chamber and connected to the valve structure such that the water-side diaphragm allows the valve structure to:
a) be moved in a first direction along a longitudinal axis of the valve structure and hereby increase the volume in the water chamber; and
b) be moved in an opposite direction along the longitudinal axis of the valve structure and hereby decrease the volume in the water chamber, and
wherein the force generating unit is arranged and configured to provide a predefined force ($F_{air}$) to move the slidably arranged valve structure in a predefined direction, wherein the force generating unit is configured to control the flow of liquid such that the pressure of liquid in the tubular member is maintained within a predefined pressure range ($P_{W1}$-$P_{W2}$).

11. The flow control system according to claim 10, wherein the force generating unit is integrated in the flow regulating valve.

12. The flow control system according to claim 11, wherein the force generating unit comprises an air-side diaphragm and that the flow regulating valve comprises an air or gas containing pressure chamber that is separated from a remaining portion of the flow regulating valve via the air-side diaphragm.

13. The flow control system according to claim 12, wherein an intermediate chamber is provided between the water-side diaphragm and the air-side diaphragm.

14. The flow control system according to claim 13, wherein the intermediate chamber is in fluid communication with surroundings by a vent.

15. The flow control system according to claim 12, wherein a ratio of the product of the pressure and area of the air-side diaphragm and the water-side diaphragm is R:1, where R is between 20 and 50.

16. The flow control system according to claim 10, wherein the liquid containing water chamber is separated from a remaining portion of the flow regulating valve via a water-side diaphragm, wherein a slider is slidably arranged in an inner space of the flow regulating valve, wherein an air-side diaphragm and the water-side diaphragm are arranged and configured such that air or gas in the pressure chamber provides a pressure that forces the air-side diaphragm to press against the slider, wherein a liquid in the water chamber provides a pressure that forces the water-side diaphragm to press against the slider in the opposite direction than the air-side diaphragm.

17. The flow control system according to claim 16, wherein a ratio of the product of the pressure and area of the air-side diaphragm and the water-side diaphragm is R:1, where R is between 20 and 50.

18. The flow control system according to claim 16, wherein an intermediate chamber is provided between the water-side diaphragm and the air-side diaphragm.

19. The flow control system according to claim 18, wherein the intermediate chamber is in fluid communication with surroundings by a vent.

20. The flow control system according to claim 16, further comprising an air pressure control unit, wherein the pressure chamber comprises an air inlet port for allowing a flow of air between the pressure chamber and the air pressure control unit.

* * * * *